United States Patent
Tsai

(10) Patent No.: US 8,319,702 B2
(45) Date of Patent: Nov. 27, 2012

(54) TWO-DIMENSIONAL AND THREE-DIMENSIONAL DISPLAY DEVICE AND DRIVING METHOD THEREOF

(75) Inventor: Meng-Chieh Tsai, Taipei County (TW)

(73) Assignee: Au Optronics Corporation, Hsinchu (TW)

( * ) Notice: Subject to any disclaimer, the term of this patent is extended or adjusted under 35 U.S.C. 154(b) by 85 days.

(21) Appl. No.: 13/073,983

(22) Filed: Mar. 28, 2011

(65) Prior Publication Data

US 2012/0105409 A1 May 3, 2012

(30) Foreign Application Priority Data

Oct. 29, 2010 (TW) ............................... 99137282 A

(51) Int. Cl.
*G09G 5/00* (2006.01)
(52) U.S. Cl. ............................... 345/6; 345/4
(58) Field of Classification Search ............ 345/1.1, 345/1.3, 3.1, 4–6, 211
See application file for complete search history.

(56) References Cited

U.S. PATENT DOCUMENTS

| | | | |
|---|---|---|---|
| 5,969,850 | A | 10/1999 | Harrold et al. |
| 7,453,529 | B2 | 11/2008 | Nam et al. |
| 8,059,063 | B2 | 11/2011 | Nam et al. |
| 2006/0197725 | A1 | 9/2006 | Nam et al. |

FOREIGN PATENT DOCUMENTS

| | | |
|---|---|---|
| CN | 1828364 | 9/2006 |
| KR | 10-2006-0124849 | 12/2006 |

OTHER PUBLICATIONS

"Second Office Action of China counterpart application" issued on Apr. 23, 2012, p. 1-p. 6, in which CN1828364 was cited.
"Office Action of China counterpart application" issued on Sep. 21, 2012, p. 1-p. 9, in which the listed reference was cited.

*Primary Examiner* — Ricardo L Osorio
(74) *Attorney, Agent, or Firm* — Jianq Chyun IP Office

(57) ABSTRACT

A 2D and 3D display device includes a display panel and a barrier panel. The barrier panel includes a first base, a first electrode layer, a first patterned electrode, a second base, a second electrode layer, a second patterned electrode and an electro-enabled material layer. The first electrode layer substantially completely covers the first base. The first patterned electrode is disposed on the first electrode layer and electrically insulated from the first electrode layer. The second base is disposed opposite to the first base. The second electrode layer substantially completely covers the second base. The second patterned electrode is disposed on the second electrode layer and electrically insulated from the second electrode layer, and an extending direction of the second patterned electrode substantially crosses over an extending direction of the first patterned electrode. The electro-enabled material layer is disposed between the first base and the second base.

15 Claims, 13 Drawing Sheets

TWO-DIMENSIONAL AND THREE-DIMENSIONAL DISPLAY DEVICE AND DRIVING METHOD THEREOF

CROSS-REFERENCE TO RELATED APPLICATION

This application claims the priority benefit of Taiwan application serial no. 99137282, filed Oct. 29, 2010. The entirety of the above-mentioned patent application is hereby incorporated by reference herein and made a part of this specification.

BACKGROUND OF THE INVENTION

1. Field of the Invention

The present invention generally relates to a two-dimensional (2D) and three-dimensional (3D) display device and a driving method thereof, in particular, to a display device capable of providing a 2D display mode, a portrait 3D display mode and a landscape 3D display mode, and a driving method thereof.

2. Description of Related Art

Currently 3D display technologies may be approximately categorized into auto-stereoscopic technologies allowing a viewer to directly view with naked eyes and stereoscopic technologies requiring the viewer to wear specially designed glasses. The working principle of auto-stereoscopic 3D display is mainly to utilize a fixed barrier to control images received by left and right eyes of the viewer. According to the visual characteristics of human eyes, when the left and right eyes respectively view two images having the same image content but different parallaxes, the human eyes will superpose the two images and perceive a 3D image. The working principle of stereoscopic 3D display is mainly to utilize a display device to display left-eye and right-eye frames, and enable left and right eyes to respectively view the left-eye and right-eye frames through selection of head-mounted glasses, so as to form a 3D impression.

Moreover, currently, many display devices are capable of providing a portrait display mode and a landscape display mode. However, the display devices capable of providing the portrait display mode and the landscape display mode are currently mostly implemented in 2D display devices. With the development of 3D display devices, 3D display devices capable of providing a portrait 3D display mode and a landscape 3D display mode are being actively developed.

SUMMARY OF THE INVENTION

Accordingly, the present invention is directed to a two-dimensional (2D) and three-dimensional (3D or stereograph) display device and a driving method thereof, which not only can provide a 2D display mode, but can also provide a portrait 3D display mode and a landscape 3D display mode.

The present invention provides a 2D and 3D display device including a display panel and a barrier panel disposed at a side of the display panel. The barrier panel includes a first base, a first electrode layer, a first patterned electrode, a second base, a second electrode layer, a second patterned electrode and an electro-enabled material layer. The first electrode layer substantially completely covers the first base. The first patterned electrode is disposed on the first electrode layer and electrically insulated from the first electrode layer. The second base is disposed opposite to the first base. The second electrode layer substantially completely covers the second base. The second patterned electrode is disposed on the second electrode layer and electrically insulated from the second electrode layer, and an extending direction of the second patterned electrode substantially crosses over an extending direction of the first patterned electrode. The electro-enabled material layer is disposed between the first base and the second base.

The present invention provides a driving method of a 2D and 3D display device. The driving method includes providing a display panel and a barrier panel disposed at a side of the display panel. The barrier panel includes a first base, a first electrode layer, a first patterned electrode, a second base, a second electrode layer, a second patterned electrode and an electro-enabled material layer. The first electrode layer substantially completely covers the first base. The first patterned electrode is disposed on the first electrode layer and electrically insulated from the first electrode layer. The second base is disposed opposite to the first base. The second electrode layer substantially completely covers the second base. The second patterned electrode is disposed on the second electrode layer and electrically insulated from the second electrode layer, and an extending direction of the second patterned electrode substantially crosses over an extending direction of the first patterned electrode. The electro-enabled material layer is disposed between the first base and the second base. When a first driving voltage is received by the first patterned electrode, and a second driving voltage is received by the first electrode layer, the second electrode layer and the second patterned electrode, the 2D and 3D display device is in a portrait 3D display mode, in which the first driving voltage is substantially different from the second driving voltage. When the first driving voltage is received by the second patterned electrode, and the second driving voltage is received by the first electrode layer, the second electrode layer and the first patterned electrode, the 2D and 3D display device is in a landscape 3D display mode. When either the second driving voltage or the first driving voltage is received by the first electrode layer, the second electrode layer, the first patterned electrode and the second patterned electrode at the same time, the 2D and 3D display device is in a 2D display mode.

Based on the above, according to the present invention, the barrier panel disposed on the display panel has a special electrode design, and by driving the electrodes in the barrier panel, the display device can be enabled to have a 2D display mode, a portrait 3D display mode and a landscape 3D display mode.

In order to make the aforementioned features and advantages of the present invention more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
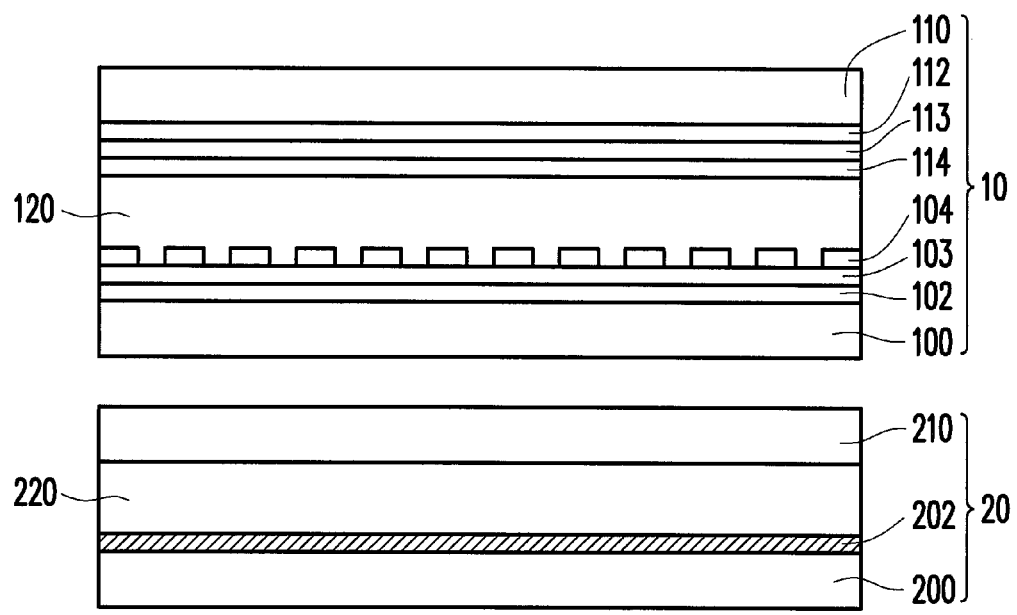
FIG. 1 is a schematic view of a 2D and 3D display device according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic view of a 2D and 3D display device according to an embodiment of the present invention. Referring to FIG. 1, the 2D and 3D display device of this embodiment includes a display panel 20 and a barrier panel 10 disposed at a side of the display panel 20.

The display panel 20 includes a base (also referred to as a third base) 200, a base (also referred to as a fourth base) 210 disposed opposite to the base 200, and a display medium layer 220 disposed between the base 200 and the base 210.

According to this embodiment, the material of the base 200 may be glass, quartz, an organic polymer, a non-light-transmissive/reflective material (for example, a conductive material, metal, a wafer, ceramics, or other suitable materials), or other suitable materials. If a conductive material or metal is used, an insulating layer (not shown) is covered on the base 200, so as to avoid a short circuit. The material of the base 210 is preferably glass, quartz, an organic polymer, or other transparent materials. In addition, the display medium layer 220 disposed between the base 200 and the base 210 may include liquid crystal molecules, an electrophoretic display medium, an self-emitting display medium, or other suitable media.

Figure 2:
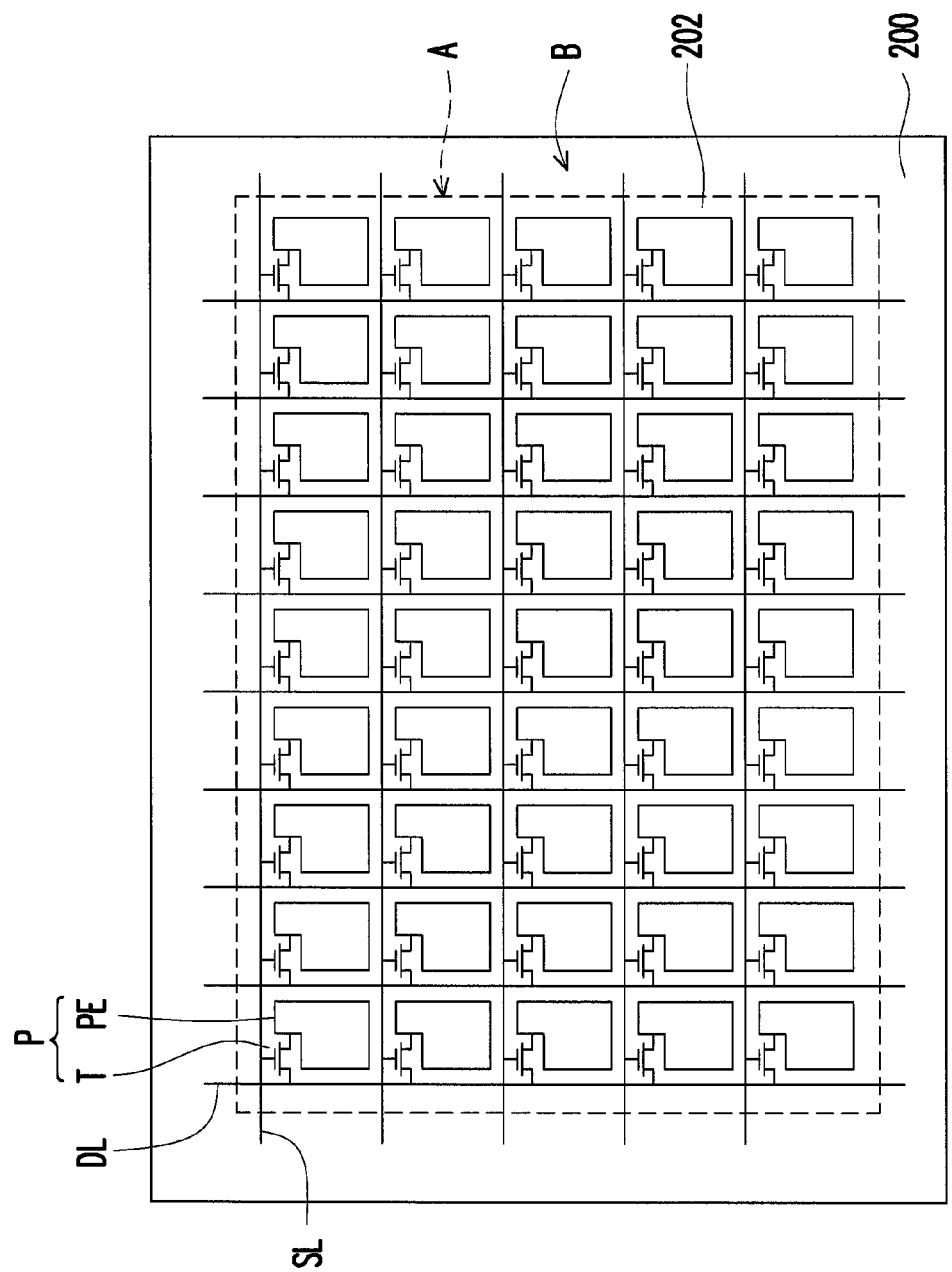
FIG. 2 is a schematic top view of a base and a pixel array layer in the display panel of FIG. 1.

Moreover, a pixel array layer 202 is disposed on a surface of the base 200. The pixel array layer 202 disposed on the base 200 is as shown in FIG. 2. In detail, the base 200 includes an active area A and a peripheral area B, and the active area A may also be referred to as a display area. The active area A contains a plurality of signal lines (for example, scan lines SL and data lines DL) and a plurality of pixel structures P. Each pixel structure has at least one switch element T and at least one pixel electrode PE electrically connected to the at least one switch element T.

The scan lines SL and the data lines DL are disposed to cross over each other. In other words, an extending direction of the data lines DL is not parallel to an extending direction of the scan lines SL, and preferably, the extending direction of the data lines DL is substantially perpendicular to the extending direction of the scan lines SL. In addition, the scan lines SL and the data lines DL belong to different layers. In consideration of electrical conductivity, the scan lines SL and the data lines DL are generally made of a metal material. However, the present invention is not limited thereto, and according to other embodiments, the scan lines SL and the data lines DL may also be made of other conductive materials (for example, an alloy, a nitride of a metal material, an oxide of a metal material, an oxynitride of a metal material, or other suitable materials), or a stacked layer of a metal material and other conductive materials.

Each pixel structure P is electrically connected to the corresponding scan line SL and data line DL. According to this embodiment, the pixel structure P includes a switch element T and a pixel electrode PE. The switch element T may be a bottom-gate thin-film transistor or a top-gate thin-film transistor. The switch element T is electrically connected to the scan line SL and the data line DL, and the pixel electrode PE is electrically connected to the switch element T. In further detail, the switch element T includes a gate, a source and a drain, in which the gate is electrically connected to the scan line SL, the source is electrically connected to the data line DL, and the drain is electrically connected to the pixel electrode PE. The pixel electrode PE may be a transmissive pixel electrode, a reflective pixel electrode or a semi-transmissive/semi-reflective pixel electrode. The material of the transmissive pixel electrode includes a metal oxide, for example, indium tin oxide, indium zinc oxide, aluminum tin oxide, aluminum zinc oxide, zinc indium germanium oxide, or other suitable oxides, or a stacked layer of at least two of the above materials. The material of the reflective pixel electrode includes a material having a high reflective index.

Still referring to FIG. 1, the base 210 disposed opposite to the base 200 may be a blank base, or a base disposed with an electrode layer (not shown). The electrode layer is a transparent conductive layer, and the material thereof includes a metal oxide, for example, indium tin oxide or indium zinc oxide. Moreover, according to another embodiment of the present invention, the base 210 may also be a base disposed with a color filter array and/or a light-shielding pattern layer (not shown).

Moreover, the barrier panel 10 is disposed at a side of the display panel 20. In detail, the barrier panel 10 may be disposed above or below the display panel 20.

The barrier panel 10 includes a first base 100, a first electrode layer 102, a first patterned electrode 104, a second base 110, a second electrode layer 112, a second patterned electrode 114 and an electro-enabled material 120. In other embodiment, one of the bases of the barrier panel 10 and one of the bases of the display panel 20 may use the same one film. For example, the first base 100 and the base 210 are the same piece, or the second base 110 and the base 200 are the same piece, which is in accordance with that the barrier panel 10 is disposed above or below the display panel 20.

According to this embodiment, the first base 100 and the second base 110 are disposed opposite to each other, and the material of the first base 100 and the second base 110 may be glass, quartz, an organic polymer, or other transparent materials. The electro-enabled material layer 120 is disposed between the first base 100 and the second base 110. The material of the electro-enabled material layer 120 includes a liquid crystal material, an electrophoretic material, an electrowetting material, or other suitable materials. Most preferably, the electro-enabled material layer 120 comprises the liquid crystal material, preferably, the electro-enabled material layer 120 comprises the electrophoretic material or the electrowetting material. Therefore, the material of the electro-enabled material layer 120 comprises the liquid crystal material in the following embodiments as examples, but it does not limit the present invention. The liquid crystal material of the electro-enabled material layer 120 includes nematic liquid crystal molecules or other suitable liquid crystal molecules.

The first electrode layer 102 substantially completely covers the first base 100, and the second electrode layer 112 substantially completely covers the second base 110. Here, the first electrode layer 102 may completely cover the first base 100, or the first electrode layer 102 completely covers a particular area of the first base 100, and the particular area is corresponding to the active area A of the display panel 20. Similarly, the second electrode layer 112 may completely cover the second base 110, or the second electrode layer 112 completely covers a particular area of the second base 110, and the particular area is corresponding to the active area A of the display panel 20. In other words, the first electrode layer 102 and the second electrode layer 112 are unpatterned film layers or film layers that are unpatterned at portions corresponding to the active area A. The first electrode layer 102 and the second electrode layer 112 are transparent conductive layers, and the material thereof may be a metal oxide, for example, indium tin oxide, indium zinc oxide, aluminum tin oxide, aluminum zinc oxide, zinc indium germanium oxide, or other suitable oxides, or a stacked layer of at least two of the above materials.

The first patterned electrode 104 is disposed above the first electrode layer 102 and electrically insulated from the first electrode layer 102. According to this embodiment, an insulating layer 103 is sandwiched between the first electrode layer 102 and the first patterned electrode 104, such that the first electrode layer 102 is electrically insulated from the first patterned electrode 104. The second patterned electrode 114 is disposed above the second electrode layer 112 and electrically insulated from the second electrode layer 112. According to this embodiment, an insulating layer 113 is sandwiched between the second electrode layer 112 and the second patterned electrode 114, such that the second electrode layer 112 is electrically insulated from the second patterned electrode 114.

The first patterned electrode 104 and the second patterned electrode 114 are transparent conductive layers, and the material thereof may be a metal oxide, for example, indium tin oxide, indium zinc oxide, aluminum tin oxide, aluminum zinc oxide, zinc indium germanium oxide, or other suitable oxides, or a stacked layer of at least two of the above materials. The material of the insulating layer 103 and the insulating layer 113 includes an inorganic material (for example, silicon oxide, silicon nitride, silicon oxynitride, other suitable materials, or a stacked layer of at least two of the above materials), an organic material, or other suitable materials, or a combination thereof.

It should be noted that, both the first patterned electrode 104 and the second patterned electrode 114 are patterned film layers, and an extending direction of the second patterned electrode 114 substantially crosses over an extending direction of the first patterned electrode 104. The pattern design of the first patterned electrode 104 and the second patterned electrode 114 may have a plurality of embodiments, which are described as follows.

First Embodiment

Figure 3A:
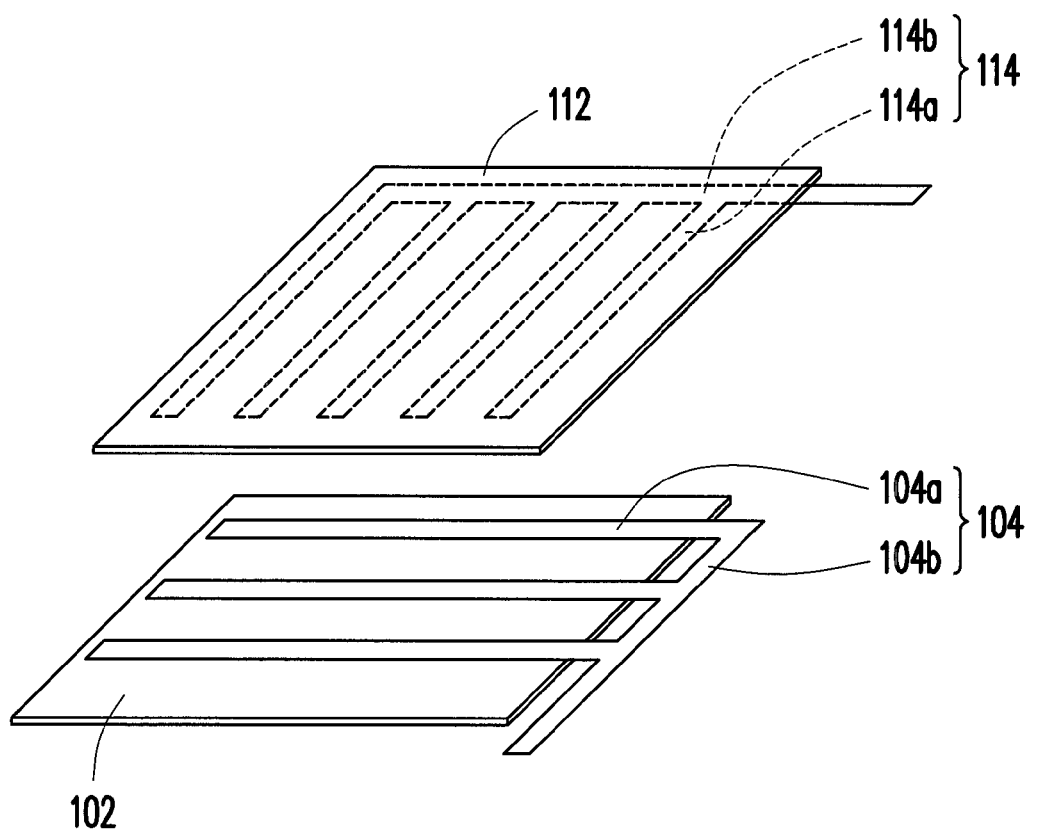
FIGS. 3A and 3B are schematic views of electrode film layers in a barrier panel according to embodiments of the present invention.

FIG. 3A is a schematic view of electrode film layers in a barrier panel according to an embodiment of the present invention. To illustrate the relation between the electrode film layers in the barrier panel clearly, FIG. 3A omits illustration of the insulating layer 103 between the first electrode layer 102 and the first patterned electrode 104, and omits illustration of the insulating layer 113 between the second electrode layer 112 and the second patterned electrode 114. Referring to FIG. 3A, in this embodiment, the first patterned electrode 104 includes a first connecting portion 104b and a plurality of first branch portions 104a, and an end of each first branch portion 104a is connected to the first connecting portion 104b. Similarly, the second patterned electrode 114 includes a second connecting portion 114b and a plurality of second branch portions 114a, and an end of each second branch portion 114a is connected to the second connecting portion 114b. Particularly, an extending direction of the first branch portions 104a substantially crosses over an extending direction of the second branch portions 114b. According to this embodiment, the first branch portions 104a are substantially perpendicular to the second branch portions 114a.

Further, the first branch portions 104a of the first patterned electrode 104 and the second branch portions 114a of the second patterned electrode 114 are correspondingly disposed in the active area A of the display panel, so as to control twisting of the liquid crystal layer 120 in the barrier panel 10. The first connecting portion 104b of the first patterned electrode 104 and the second connecting portion 114b of the second patterned electrode 114 are correspondingly disposed in the peripheral area B of the display panel, and are mainly used to enable the first branch portions 104a and the second branch portions 114a to be electrically connected to a particular potential or voltage.

Figure 3B:
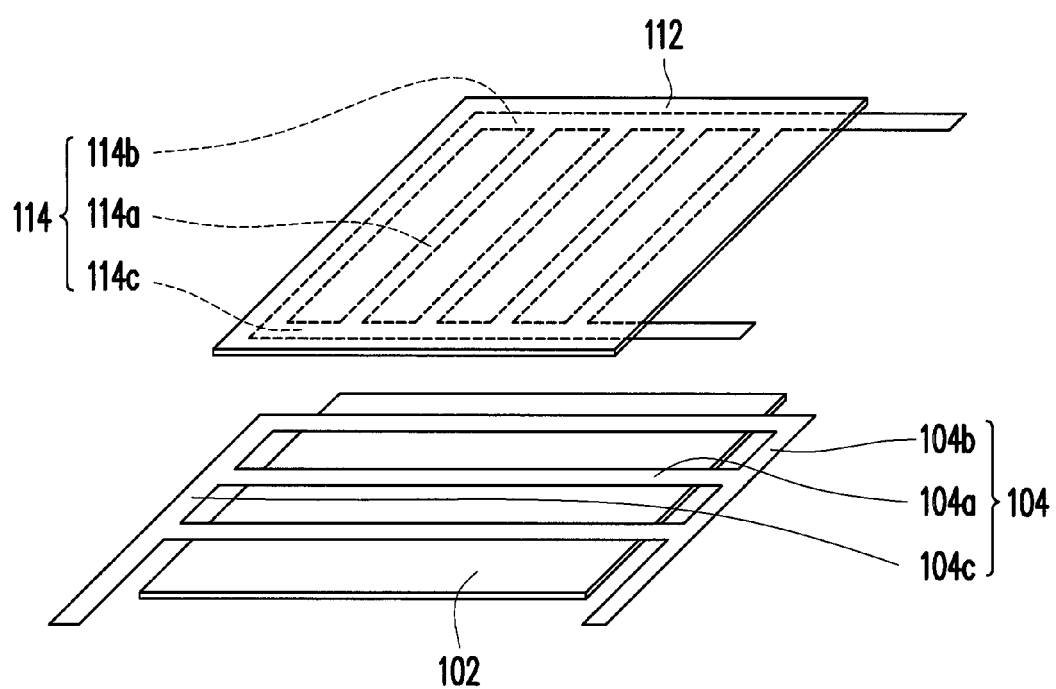

FIG. 3B is a schematic view of electrode film layers in a barrier panel according to another embodiment of the present invention. The embodiment of FIG. 3B is similar to the embodiment of FIG. 3A, so the same elements as those in FIG. 3A are represented by the same symbols and will not be described herein again. The difference between the embodiment of FIG. 3B and the embodiment of FIG. 3A lies in that the first patterned electrode 104 further includes a first auxiliary connecting portion 104c, connected to the other end of each first branch portion 104a, and the second patterned electrode 114 further includes a second auxiliary connecting portion 114c, connected to the other end of each second branch portion 114a.

When the barrier panel 10 adopts the electrode design of FIG. 3A or 3B, a display device formed by combining the barrier panel 10 with the display panel 20 has a 2D display mode, a portrait 3D display mode and a landscape 3D display mode, which are described as follows.

Portrait 3D Display Mode

Figure 4A:
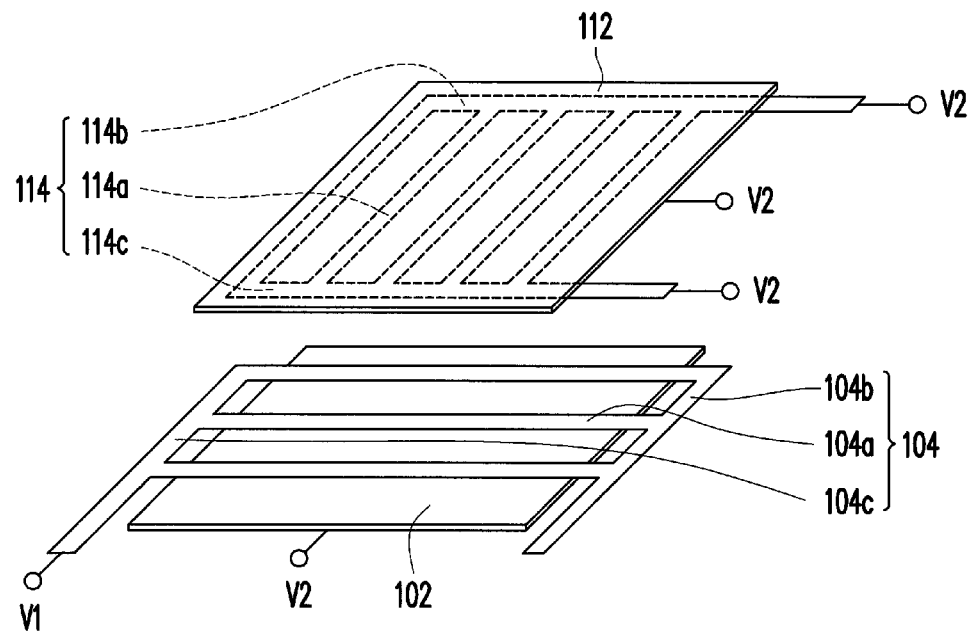
FIG. 4A is a schematic view of a driving method according to an embodiment of the present invention for enabling a display device to display a 3D image in a portrait 3D display mode.

Referring to FIG. 4A, when it intends to enable the display device to display a 3D image in the portrait 3D display mode, a first driving voltage (V1) is applied to the first patterned electrode 104, and a second driving voltage (V2) is applied to the first electrode layer 102, the second electrode layer 112 and the second patterned electrode 114, in which the first driving voltage (V1) is substantially different from the second driving voltage (V2). Generally, in order to enable the liquid crystal layer 120 in the barrier panel 10 to achieve a desirable twisting effect such that the barrier panel 10 can generate a desirable barrier pattern, the first driving voltage (V1) may be a twist driving voltage of the liquid crystal layer 120, which may be an alternating current (AC) or a direct current (DC), and the second driving voltage (V2) may be a grounding voltage or an about zero voltage. In other words, the first driving voltage (V1) is substantially greater than the second driving voltage (V2).

Figure 4B:
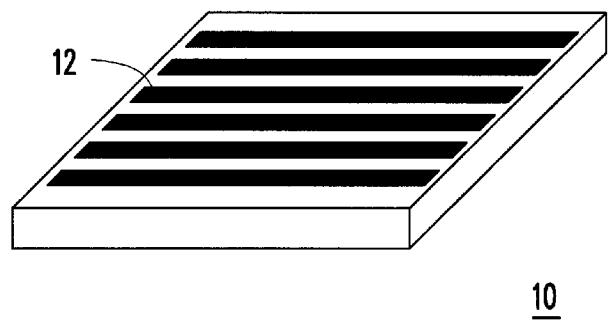
FIG. 4B is a schematic view of the use of the driving method of FIG. 4A to enable the barrier panel to generate a barrier pattern.

According to the above, after the electrode film layers in the barrier panel are driven by the above driving method, the barrier panel 10 can generate a barrier pattern 12 as shown in FIG. 4B. In other words, the above driving method can enable the barrier panel 10 to generate a landscape barrier pattern 12, which is suitable for enabling the display device to display a 3D image of the portrait 3D display mode from any angle chosen by the viewer.

Landscape 3D Display Mode

Figure 5A:
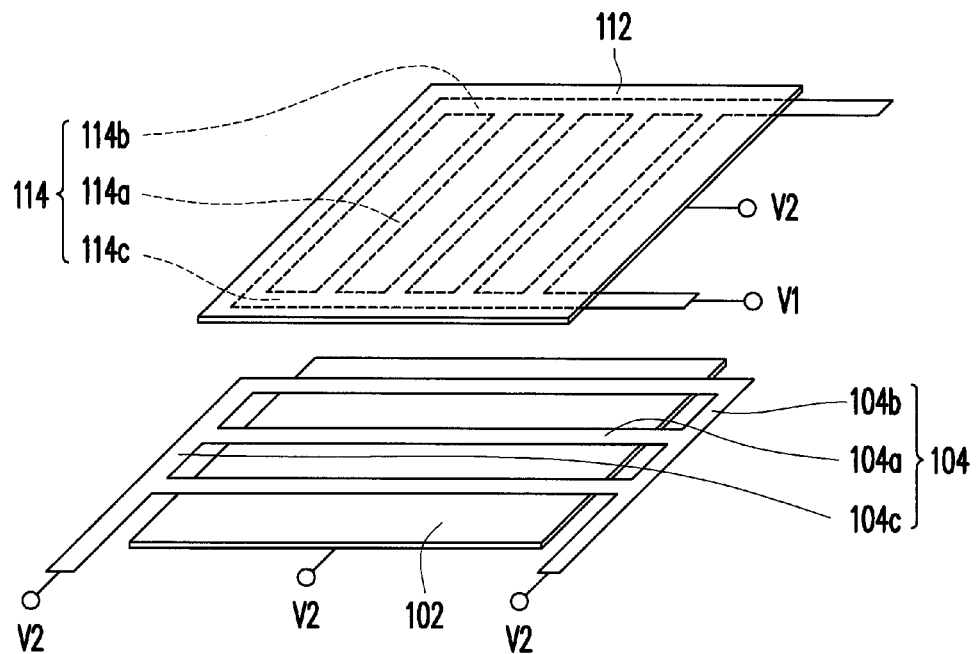
FIG. 5A is a schematic view of a driving method according to an embodiment of the present invention for enabling a display device to display a 3D image in a landscape 3D display mode.

Referring to FIG. 5A, when it intends to enable the display device to display a 3D image in the landscape 3D display mode, a first driving voltage (V1) is applied to the second patterned electrode 114, and a second driving voltage (V2) is applied to the first electrode layer 102, the first patterned electrode 104 and the second electrode layer 112, in which the first driving voltage (V1) is substantially different from the second driving voltage (V2). Similarly, in order to enable the liquid crystal layer 120 in the barrier panel 10 to achieve a desirable twisting effect, the first driving voltage (V1) may be a twist driving voltage of the liquid crystal layer 120, which may be an AC or a DC, and the second driving voltage (V2) may be a grounding voltage or a substantial zero voltage. In other words, the first driving voltage (V1) is substantially greater than the second driving voltage (V2).

Figure 5B:
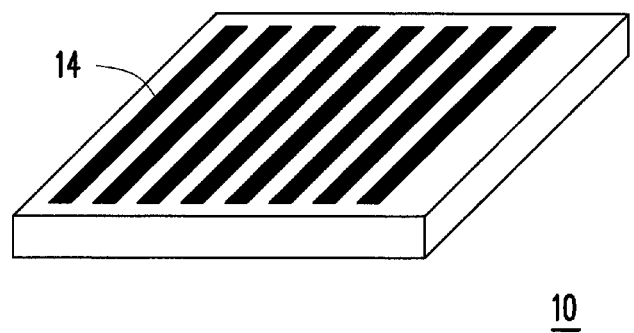
FIG. 5B is a schematic view of the use of the driving method of FIG. 5A to enable the barrier panel to generate a barrier pattern.

According to the above, after the electrode film layers in the barrier panel are driven by the above driving method, the barrier panel 10 can generate a barrier pattern 14 as shown in FIG. 5B. In other words, the above driving method can enable the barrier panel 10 to generate a portrait barrier pattern 14, which is suitable for enabling the display device to display a 3D image of the landscape 3D display mode from any angle chosen by the viewer.

2D Display Mode

Figure 6A:
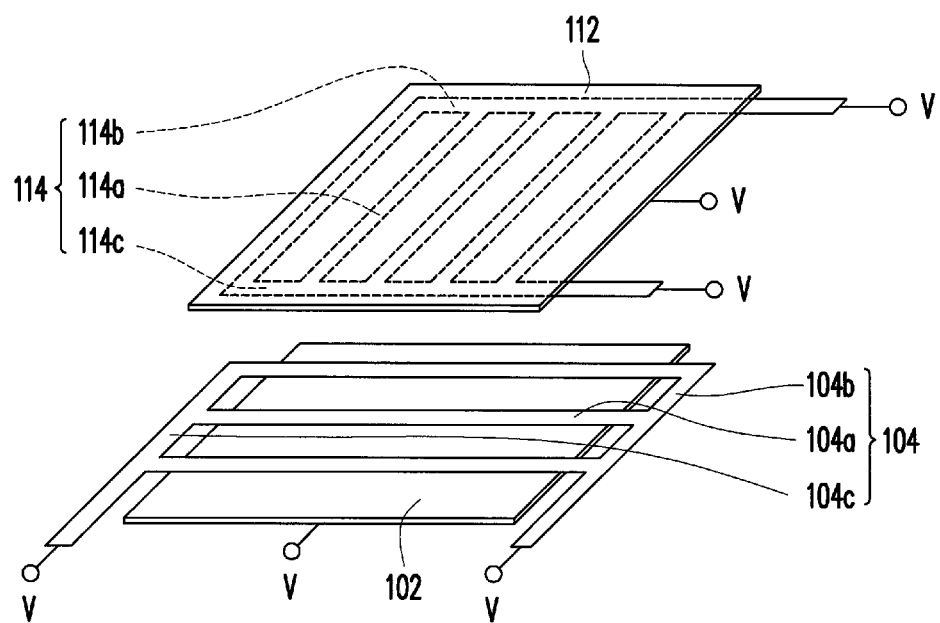
FIG. 6A is a schematic view of a driving method according to an embodiment of the present invention for enabling a display device to display a 2D image in a planar display mode.

Referring to FIG. 6A, when it intends to enable the display device to display a 2D image in the 2D or planar display mode, a driving voltage (V) is applied to the first electrode layer 102, the first patterned electrode 104, the second electrode layer 112 and the second patterned electrode 114, in which the driving voltage (V) may be a first driving voltage (V1) or a second driving voltage (V2). The first driving voltage (V1) is, for example, a twist driving voltage of the liquid crystal layer 120, and the second driving voltage (V2) may be a grounding voltage or a about zero voltage. In other words, the first driving voltage (V1) is different from the second driving voltage (V2), for instance, the first driving voltage (V1) is substantially greater than the second driving voltage (V2).

Figure 6B:
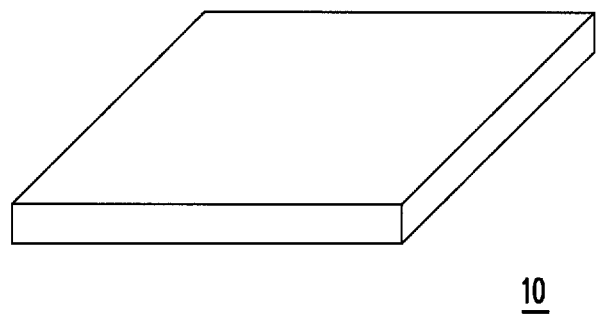
FIG. 6B is a schematic view of the use of the driving method of FIG. 6A to enable the barrier panel to generate a white frame.

According to the above, after the electrode film layers in the barrier panel are driven by the above driving method, the barrier panel 10 can generate a white frame as shown in FIG. 6B. At this time, since the barrier panel 10 does not have any barrier pattern, the display device displays a 2D image in the planar display mode. In further detail, if the barrier panel 10 belongs to liquid crystal cells that are normally white when no voltage is applied, the driving voltage (V) may be a grounding voltage or a substantial zero voltage, so as to enable the barrier panel 10 to present a white frame. If the barrier panel 10 belongs to liquid crystal cells that are normally black when no voltage is applied, the driving voltage (V) of the first electrode layer 102 and the first patterned electrode 104 is, for example, the second driving voltage (V2), and the driving voltage (V) of the second electrode layer 112 and the second patterned electrode 114 is, for example, the first driving voltage (V1), such that a voltage difference exists between electrodes at two sides of the liquid crystal layer, so as to enable the barrier panel 10 to present a white frame. The display device to display a 2D image of the 2D display mode from any angle chosen by the viewer.

Second Embodiment

Figure 7:
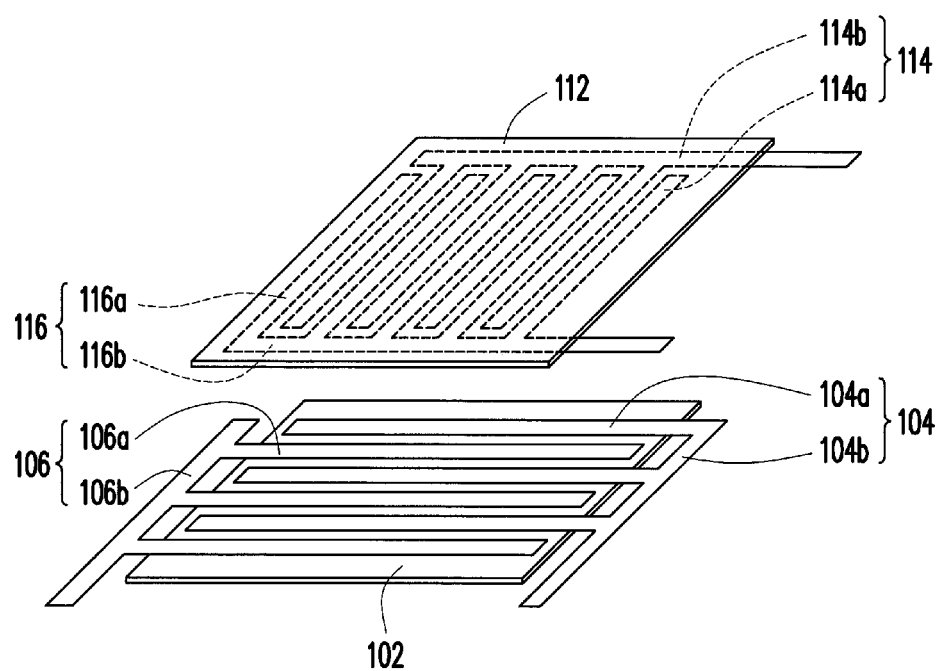
FIG. 7 is a schematic view of electrode film layers in a barrier panel according to another embodiment of the present invention.

FIG. 7 is a schematic view of electrode film layers in a barrier panel according to another embodiment of the present invention. The embodiment of FIG. 7 is similar to the embodiment of FIG. 3A, so the same elements as those in FIG. 3A are represented by the same symbols and will not be described herein again. The difference between the embodiment of FIG. 7 and the embodiment of FIG. 3A lies in that the barrier panel further includes a third patterned electrode 106 and a fourth patterned electrode 116. Particularly, the third patterned electrode 106 is disposed on the first electrode layer 102 and electrically insulated from the first electrode layer 102 and the first patterned electrode 104, and the third patterned electrode 106 and the first patterned electrode 104 are alternately disposed (or namely stagger disposed). The fourth patterned electrode 116 is disposed on the second electrode layer 112 and electrically insulated from the second electrode layer 112 and the second patterned electrode 114, and the fourth patterned electrode 116 and the second patterned electrode 114 are alternately disposed. In fact, FIG. 7 omits illustration of an insulating layer disposed between the first electrode layer 102 and the first patterned electrode 104/the third patterned electrode 106, and omits illustration of an insulating layer disposed between the second electrode layer 112 and the second patterned electrode 114/the fourth patterned electrode 116.

Similarly, in this embodiment, the first patterned electrode 104 includes a first connecting portion 104b and a plurality of first branch portions 104a, and an end of each first branch portion 104a is connected to the first connecting portion 104b. The second patterned electrode 114 includes a second connecting portion 114b and a plurality of second branch portions 114a, and an end of each second branch portion 114a is connected to the second connecting portion 114b. The third patterned electrode 106 includes a third connecting portion 106b and a plurality of third branch portions 106a, and an end of each third branch portion 106a is connected to the third connecting portion 106b. The fourth patterned electrode 116 includes a fourth connecting portion 116b and a plurality of fourth branch portions 116a, and an end of each fourth branch portion 116a is connected to the fourth connecting portion 116b. Particularly, an extending direction of the first branch portions 104a substantially crosses over an extending direction of the second branch portions 114b, and an extending direction of the fourth branch portions 116a substantially crosses over an extending direction of the third branch portions 106a. According to this embodiment, the first branch portions 104a are substantially perpendicular to the second branch portions 114a, and the fourth branch portions 116a are substantially perpendicular to the third branch portions 106a. Perfectly, the second patterned electrode 114 and the fourth patterned electrode 116 are same film layer, or the third patterned electrode 106 and the first patterned electrode 104 are same film layer, but it is not limited in the present invention.

When the barrier panel 10 adopts the electrode design of FIG. 7, a display device formed by combining the barrier panel 10 with the display panel 20 has a 2D display mode, a portrait 3D display mode and a landscape 3D display mode, which are described as follows.

Portrait 3D Display Mode

Figure 8A:
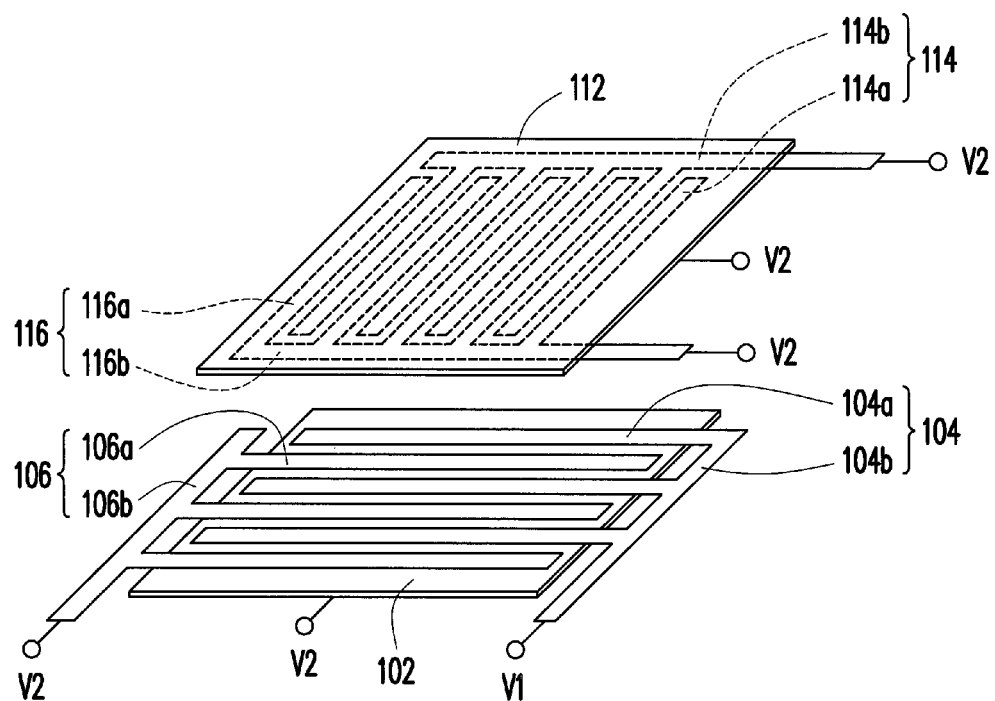
FIG. 8A is a schematic view of a driving method according to an embodiment of the present invention for enabling a display device to display a 3D image in a portrait 3D display mode.

Referring to FIG. 8A, when it intends to enable the display device to display a 3D image in the portrait 3D display mode, a first driving voltage (V1) is received by the first patterned electrode 104, and a second driving voltage (V2) is received by the first electrode layer 102, the second electrode layer 112, the second patterned electrode 114, the third patterned electrode 106 and the fourth patterned electrode 116, in which the first driving voltage (V1) is substantially different from the second driving voltage (V2).

Generally, in order to enable the liquid crystal layer 120 in the barrier panel 10 to achieve a desirable twisting effect such that the barrier panel 10 can generate a desirable barrier pattern, the first driving voltage (V1) may be a twist driving voltage of the liquid crystal layer 120, which may be an AC or a DC, and the second driving voltage (V2) may be a grounding voltage or a substantial zero voltage. In other words, the first driving voltage (V1) is substantially greater than the second driving voltage (V2).

Figure 8B:
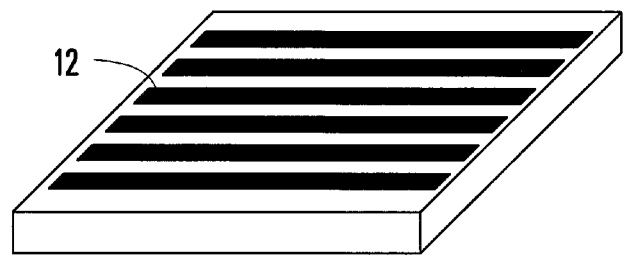
FIG. 8B is a schematic view of the use of the driving method of FIG. 8A to enable the barrier panel to generate a barrier pattern.

According to the above, after the electrode film layers in the barrier panel are driven by the above driving method, the barrier panel 10 can generate a barrier pattern 12 as shown in FIG. 8B. In other words, the above driving method can enable the barrier panel 10 to generate a landscape barrier pattern 12, which is suitable for enabling the display device to display a 3D image of the portrait 3D display mode from any angle chosen by the viewer.

Landscape 3D Display Mode

Figure 9A:
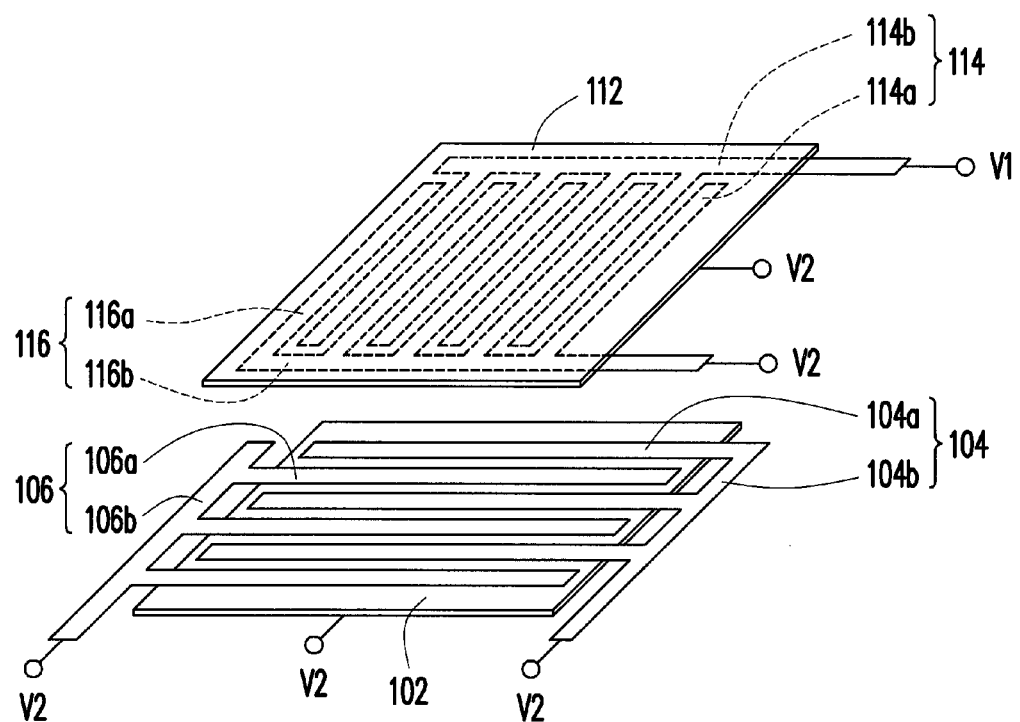
FIG. 9A is a schematic view of a driving method according to an embodiment of the present invention for enabling a display device to display a 3D image in a landscape 3D display mode.

Referring to FIG. 9A, when it intends to enable the display device to display a 3D image in the landscape 3D display mode, a first driving voltage (V1) is received by the second patterned electrode 114, and a second driving voltage (V2) is received by the first electrode layer 102, the first patterned electrode 104, the second electrode layer 112, the third patterned electrode 106 and the fourth patterned electrode 116, in which the first driving voltage (V1) is substantially different from the second driving voltage (V2). Similarly, in order to enable the liquid crystal layer 120 in the barrier panel 10 to achieve a desirable twisting effect, for example, the first driving voltage (V1) may be a twist driving voltage of the liquid crystal layer 120, which may be an AC signal or a DC signal, and the second driving voltage (V2) may be a grounding voltage or a substantial zero voltage. In other words, the first driving voltage (V1) is substantially greater than the second driving voltage (V2).

Figure 9B:
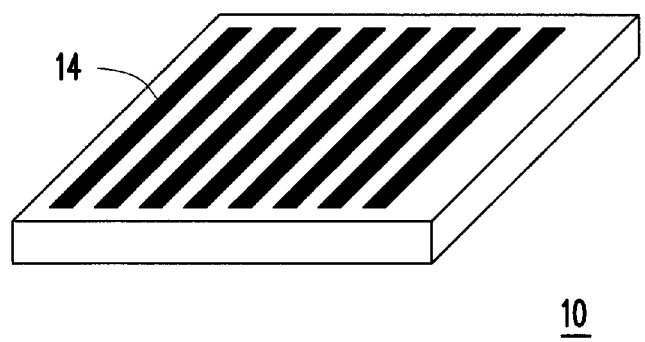
FIG. 9B is a schematic view of the use of the driving method of FIG. 9A to enable the barrier panel to generate a barrier pattern.

According to the above, after the electrode film layers in the barrier panel are driven by the above driving method, the barrier panel 10 can generate a barrier pattern 14 as shown in FIG. 9B. In other words, the above driving method can enable the barrier panel 10 to generate a portrait barrier pattern 14, which is suitable for enabling the display device to display a 3D image of the landscape 3D display mode from any angle chosen by the viewer.

2D Display Mode

Figure 10A:
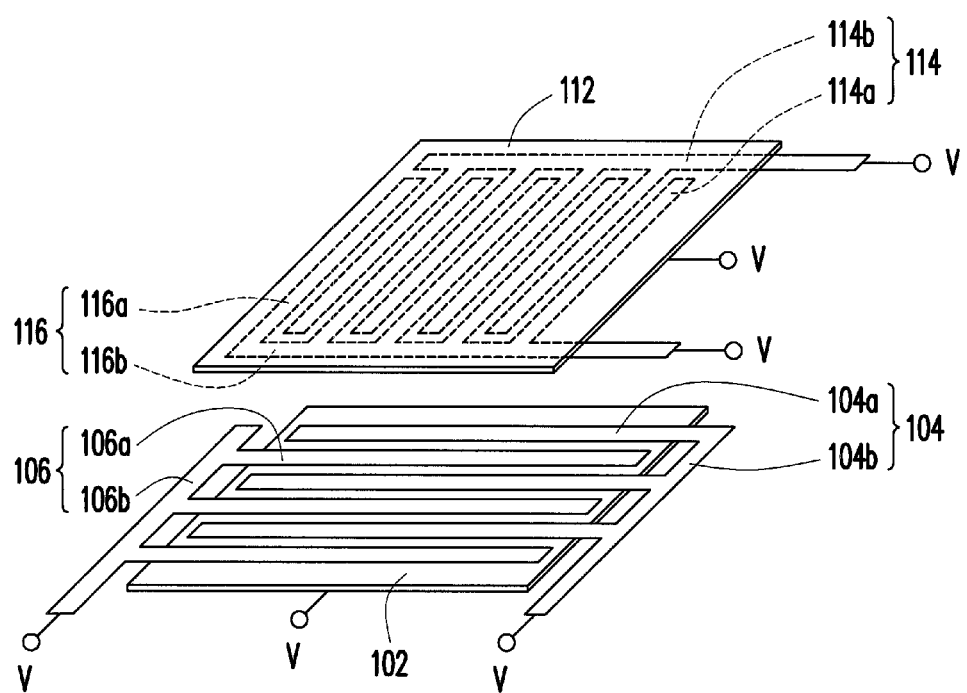
FIG. 10A is a schematic view of a driving method according to an embodiment of the present invention for enabling a display device to display a 2D image in a planar display mode.

Referring to FIG. 10A, when it intends to enable the display device to display a 2D image in the 2D or planar display mode, a driving voltage (V) is received by the first electrode layer 102, the first patterned electrode 104, the second electrode layer 112, the second patterned electrode 114, the third patterned electrode 106 and the fourth patterned electrode 116, in which the driving voltage (V) may be a first driving voltage (V1) or a second driving voltage (V2). The first driving voltage (V1) is, for example, a twist driving voltage of the liquid crystal layer 120, and the second driving voltage (V2) may be a grounding voltage or a substantial zero voltage. In other words, the first driving voltage (V1) is different from the second driving voltage (V2), for instance, the first driving voltage (V1) is substantially greater than the second driving voltage (V2).

Figure 10B:
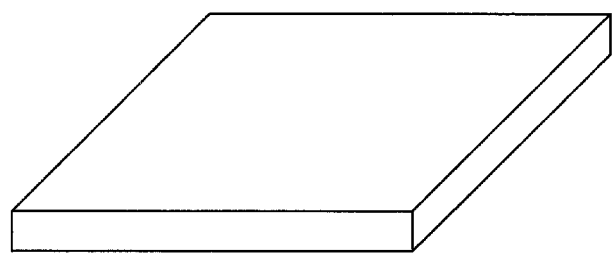
FIG. 10B is a schematic view of the use of the driving method of FIG. 10A to enable the barrier panel to generate a white frame.

According to the above, after the electrode film layers in the barrier panel are driven by the above driving method, the barrier panel 10 can generate a white frame as shown in FIG. 10B. At this time, since the barrier panel 10 does not have any barrier pattern, the display device displays a 2D image in the planar display mode. In further detail, if the barrier panel 10 belongs to liquid crystal cells that are normally white when no voltage is applied, the driving voltage (V) may be a grounding voltage or a substantial zero voltage, so as to enable the barrier panel 10 to present a white frame. If the barrier panel 10 belongs to liquid crystal cells that are normally black when no voltage is applied, the driving voltage (V) of the first electrode layer 102, the first patterned electrode 104 and the third patterned electrode 106 is, for example, the second driving voltage (V2), and the driving voltage (V) of the second electrode layer 112, the second patterned electrode 114 and the fourth patterned electrode 116 is, for example, the first driving voltage (V1), such that a voltage difference exists between electrodes at two sides of the liquid crystal layer, so as to enable the barrier panel 10 to present a white frame. The display device to display a 2D image of the 2D display mode from any angle chosen by the viewer.

Figure 11:
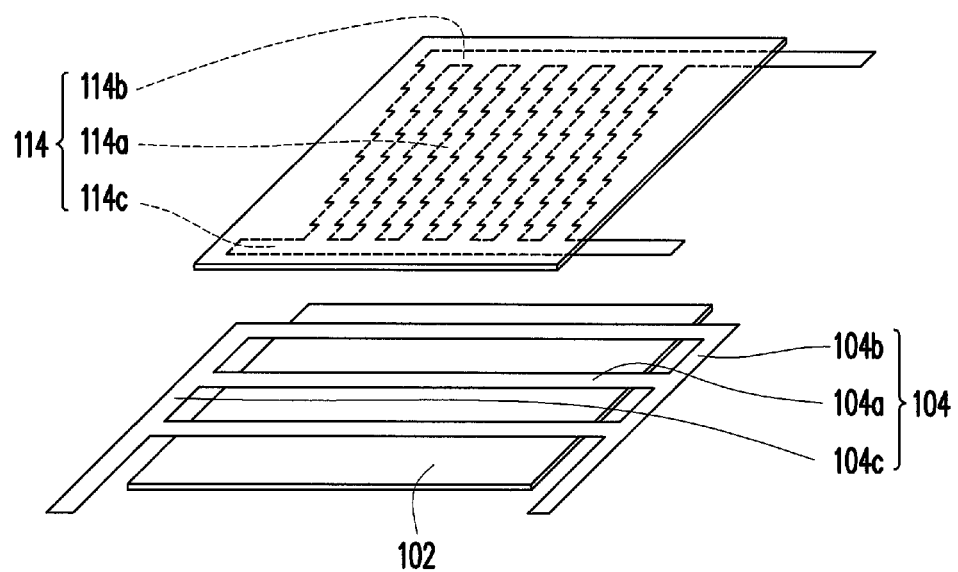
FIGS. 11 and 12 are schematic views of electrode film layers in a barrier panel according to embodiments of the present invention.

In the above embodiments, both the first patterned electrode 104 and the second patterned electrode 114 are described by taking a stripe pattern as an example; however, the present invention is not limited thereto. According to other embodiments, the patterns of the first patterned electrode 104 and the second patterned electrode 114, even the patterns of the third patterned electrode 106 and the fourth patterned electrode 116, may also be other pattern designs, for example, a step-like pattern, as the branch portions 114a of the second patterned electrode 114 shown in FIG. 11. Moreover, the patterns of the first patterned electrode 104 and the second patterned electrode 114, even the patterns of the third patterned electrode 106 and the fourth patterned electrode 116, may be a stripe pattern, a step-like pattern, zigzag type pattern, polygon pattern, or a combination thereof, respectively.

Figure 12:
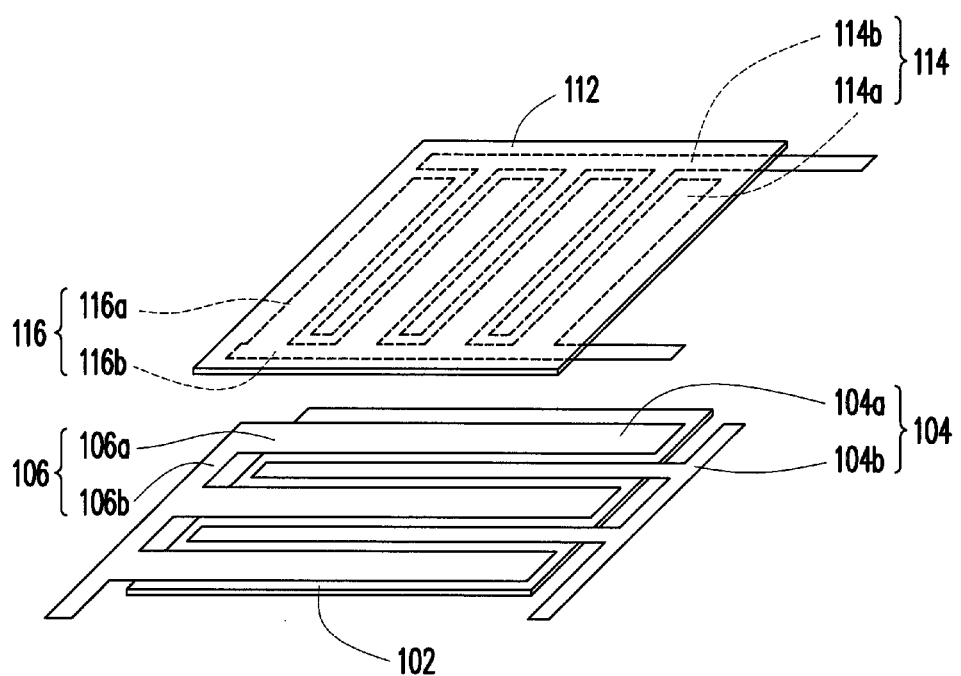

Moreover, in the above embodiments, the first patterned electrode 104, the second patterned electrode 114, the third patterned electrode 106 and the fourth patterned electrode 116 have approximately the same width; however, the present invention is not limited thereto. According to other embodiments, the widths of the first patterned electrode 104, the second patterned electrode 114, the third patterned electrode 106 and the fourth patterned electrode 116 may not be completely identical, as shown in FIG. 12.

Based on the above, the barrier panel in the display device of the present invention has a special electrode design, and by driving the electrodes in the barrier panel, the display device can be enabled to have a 2D display mode, a portrait 3D display mode and a landscape 3D display mode.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A two-dimensional (2D) and three-dimensional (3D) display device, comprising:
    a display panel; and
    a barrier panel, disposed at a side of the display panel, wherein the barrier panel comprises:
        a first base;
        a first electrode layer, substantially completely covering the first base;
        a first patterned electrode, disposed on the first electrode layer and electrically insulated from the first electrode layer;
        a second base, disposed opposite to the first base;
        a second electrode layer, substantially completely covering the second base;
        a second patterned electrode, disposed on the second electrode layer and electrically insulated from the second electrode layer, wherein an extending direction of the second patterned electrode substantially crosses over an extending direction of the first patterned electrode; and
        an electro-enabled material layer, disposed between the first base and the second base.

2. The 2D and 3D display device of claim 1, wherein
    a first driving voltage is received by the first patterned electrode, and a second driving voltage is received by the first electrode layer, the second electrode layer and the second patterned electrode, so that the 2D and 3D display device is in a portrait 3D display mode, wherein the first driving voltage is substantially different from the second driving voltage,
    the first driving voltage is received by the second patterned electrode, and the second driving voltage is received by the first electrode layer, the second electrode layer and the first patterned electrode, so that the 2D and 3D display device is in a landscape 3D display mode, or
    either the second driving voltage or the first driving voltage is received by the first electrode layer, the second electrode layer, the first patterned electrode and the second patterned electrode, so that the 2D and 3D display device is in a planar or 2D display mode.

3. The 2D and 3D display device of claim 1, wherein
    the first patterned electrode comprises:
        a first connecting portion; and
        a plurality of first branch portions, wherein an end of each first branch portion is connected to the first connecting portion;
    the second patterned electrode comprises:
        a second connecting portion; and
        a plurality of second branch portions, wherein an end of each second branch portion is connected to the second connecting portion, and an extending direction of the first branch portions substantially crosses over an extending direction of the second branch portions.

4. The 2D and 3D display device of claim 3, wherein the first branch portions are substantially perpendicular to the second branch portions.

5. The 2D and 3D display device of claim 3, wherein the first patterned electrode further comprises a first auxiliary connecting portion which is connected to the other end of each first branch portion, and the second patterned electrode further comprises a second auxiliary connecting portion which is connected to the other end of each second branch portion.

6. The 2D and 3D display device of claim 1, wherein the barrier panel further comprises:
    a third patterned electrode, disposed on the first electrode layer and electrically insulated from the first electrode layer and the first patterned electrode, wherein the third patterned electrode and the first patterned electrode are alternately disposed; and
    a fourth patterned electrode, disposed on the second electrode layer and electrically insulated from the second electrode layer and the second patterned electrode, wherein the fourth patterned electrode and the second patterned electrode are alternately disposed.

7. The 2D and 3D display device of claim 6, wherein
    the third patterned electrode comprises:
        a third connecting portion; and
        a plurality of third branch portions, wherein an end of each third branch portion is connected to the third connecting portion;
    the fourth patterned electrode comprises:
        a fourth connecting portion; and
        a plurality of fourth branch portions, wherein an end of each fourth branch portion is connected to the fourth connecting portion, and an extending direction of the fourth branch portions substantially crosses over an extending direction of the third branch portions.

8. The 2D and 3D display device of claim 1, wherein the display panel comprises:
    a third base, wherein a plurality of pixel structures and a plurality of signal lines are disposed on a surface of the third base, and each pixel structure is electrically connected to at least one of the signal lines and comprises at least one switch element and at least one pixel electrode electrically connected to the switch element;
    a fourth base, disposed opposite to the third base; and
    a display medium layer, disposed between the third base and the fourth base.

9. A driving method of a two-dimensional (2D) and three-dimensional (3D) display device, the driving method comprising:
    providing a display panel; and
    providing a barrier panel, disposed at a side of the display panel, wherein the barrier panel comprises:
        a first base;
        a first electrode layer, substantially completely covering the first base;
        a first patterned electrode, disposed on the first electrode layer and electrically insulated from the first electrode layer;
        a second base, disposed opposite to the first base;
        a second electrode layer, substantially completely covering the second base;
        a second patterned electrode, disposed on the second electrode layer and electrically insulated from the second electrode layer, wherein an extending direction of the second patterned electrode substantially crosses over an extending direction of the first patterned electrode; and
        an electro-enabled material layer, disposed between the first base and the second base; wherein when a first driving voltage is received by the first patterned electrode, and a second driving voltage is received by the first electrode layer, the second electrode layer and the second patterned electrode, the 2D and 3D display device is in a portrait 3D display mode, wherein the first driving voltage is substantially different from the second driving voltage, when the first driving voltage is received by the second patterned electrode, and the second driving voltage is received by the first electrode layer, the second electrode layer and the first patterned electrode, the 2D and 3D display device is in a landscape 3D display mode, and when either the second driving voltage or the first driving voltage is received by the first electrode layer, the second electrode layer, the first patterned electrode and the second patterned electrode at the same time, the 2D and 3D display device is in a planar or 2D display mode.

10. The driving method of a 2D and 3D display device of claim 9, wherein
the first patterned electrode comprises:
a first connecting portion; and
a plurality of first branch portions, wherein an end of each first branch portion is connected to the first connecting portion;
the second patterned electrode comprises:
a second connecting portion; and
a plurality of second branch portions, wherein an end of each second branch portion is connected to the second connecting portion, and an extending direction of the first branch portions substantially crosses over an extending direction of the second branch portions.

11. The driving method of a 2D and 3D display device of claim 10, wherein the first branch portions are substantially perpendicular to the second branch portions.

12. The driving method of a 2D and 3D display device of claim 10, wherein the first patterned electrode further comprises a first auxiliary connecting portion which is connected to the other end of each first branch portion, and the second patterned electrode further comprises a second auxiliary connecting portion which is connected to the other end of each second branch portion.

13. The driving method of a 2D and 3D display device of claim 9, wherein the barrier panel further comprises:
a third patterned electrode, disposed on the first electrode layer and electrically insulated from the first electrode layer and the first patterned electrode, wherein the third patterned electrode and the first patterned electrode are alternately disposed; and
a fourth patterned electrode, disposed on the second electrode layer and electrically insulated from the second electrode layer and the second patterned electrode, wherein the fourth patterned electrode and the second patterned electrode are alternately disposed,
wherein when the second driving voltage is received by the third patterned electrode and the fourth patterned electrode, the 2D and 3D display device is in the portrait 3D display mode or the landscape 3D display mode.

14. The driving method of a 2D and 3D display device of claim 13, wherein
the third patterned electrode comprises:
a third connecting portion; and
a plurality of third branch portions, wherein an end of each third branch portion is connected to the third connecting portion;
the fourth patterned electrode comprises:
a fourth connecting portion; and
a plurality of fourth branch portions, wherein an end of each fourth branch portion is connected to the fourth connecting portion, and an extending direction of the fourth branch portions substantially crosses over an extending direction of the third branch portions.

15. The driving method of a 2D and 3D display device of claim 9, wherein the display panel comprises:
a third base, wherein a plurality of pixel structures and a plurality of signal lines are disposed on a surface of the third base, and each pixel structure is electrically connected to at least one of the signal lines and comprises at least one switch element and at least one pixel electrode electrically connected to the switch element;
a fourth base, disposed opposite to the third base; and
a display medium layer, disposed between the third base and the fourth base.

* * * * *